(12) United States Patent
Bi

(10) Patent No.: US 8,806,384 B2
(45) Date of Patent: Aug. 12, 2014

(54) KEYBOARD GESTURES FOR CHARACTER STRING REPLACEMENT

(71) Applicant: Xiaojun Bi, Sunnyvale, CA (US)

(72) Inventor: Xiaojun Bi, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/742,223

(22) Filed: Jan. 15, 2013

(65) Prior Publication Data

US 2014/0129930 A1  May 8, 2014

Related U.S. Application Data

(60) Provisional application No. 61/721,672, filed on Nov. 2, 2012.

(51) Int. Cl.
*G06F 3/041* (2006.01)
*G06F 17/21* (2006.01)

(52) U.S. Cl.
USPC ........... 715/863; 715/705; 715/765; 715/810; 715/864; 345/173

(58) Field of Classification Search
USPC ......... 715/702, 705, 764, 765, 810, 816, 863, 715/864; 345/169, 173
See application file for complete search history.

(56) References Cited

U.S. PATENT DOCUMENTS

| | | |
|---|---|---|
| 6,286,064 B1 | 9/2001 | King et al. |
| 6,292,179 B1 | 9/2001 | Lee |
| 6,801,190 B1 | 10/2004 | Robinson et al. |
| 7,030,863 B2 | 4/2006 | Longe et al. |
| 7,042,443 B2 | 5/2006 | Woodard et al. |
| 7,075,520 B2 | 7/2006 | Williams |
| 7,088,345 B2 | 8/2006 | Robinson et al. |
| 7,098,896 B2 | 8/2006 | Kushler et al. |
| 7,145,554 B2 | 12/2006 | Bachmann |
| 7,151,530 B2 | 12/2006 | Roeber et al. |
| 7,199,786 B2 | 4/2007 | Suraqui |
| 7,250,938 B2 | 7/2007 | Kirkland et al. |
| 7,251,367 B2 | 7/2007 | Zhai |

(Continued)

FOREIGN PATENT DOCUMENTS

WO  2008013658 A2  1/2008

OTHER PUBLICATIONS

"Swipe gesture to replace Back Key?" xda developers, retrieved from http://forum.xda-developers.com/showthread.php?t=1083598, accessed on May 17, 2012, 2 pp.

(Continued)

*Primary Examiner* — Xiomar L Bautista
(74) *Attorney, Agent, or Firm* — Shumaker & Sieffert, P.A.

(57) ABSTRACT

A computing device includes at least one processor and at least one module. The module may determine and output for display a list of one or more suggested character strings based on a first input received at a presence-sensitive display. The module may further receive an indication of a second user input detected at the presence-sensitive display. The module may further determine whether the second user input includes a replacement gesture, wherein the replacement gesture includes a first gesture in a substantially leftward direction and a second gesture in a substantially rightward direction. Responsive to determining that the received gesture input includes the replacement gesture, the module may output for display in place of the displayed text, a character string chosen from the list of one or more suggested character strings.

20 Claims, 3 Drawing Sheets

(56) References Cited

U.S. PATENT DOCUMENTS

| | | | |
|---|---|---|---|
| 7,277,088 | B2 | 10/2007 | Robinson et al. |
| 7,453,439 | B1 | 11/2008 | Kushler et al. |
| 7,508,324 | B2 | 3/2009 | Suraqui |
| 7,706,616 | B2 | 4/2010 | Kristensson et al. |
| 7,716,579 | B2 | 5/2010 | Gunn et al. |
| 7,750,891 | B2 | 7/2010 | Stephanick et al. |
| 7,921,361 | B2 | 4/2011 | Gunn et al. |
| 8,036,878 | B2 | 10/2011 | Assadollahi |
| 8,135,582 | B2 | 3/2012 | Suraqui |
| 2006/0119582 | A1 | 6/2006 | Ng et al. |
| 2006/0176283 | A1 | 8/2006 | Suraqui |
| 2008/0316183 | A1 | 12/2008 | Westerman et al. |
| 2010/0222559 | A1 | 9/2010 | Yoshida et al. |
| 2012/0036469 | A1 | 2/2012 | Suraqui |
| 2012/0044175 | A1* | 2/2012 | Cho .................... 345/173 |
| 2012/0079373 | A1 | 3/2012 | Kocienda et al. |
| 2012/0098766 | A1* | 4/2012 | Dippel et al. ........... 345/173 |
| 2012/0120000 | A1* | 5/2012 | Lucic et al. ........... 345/173 |
| 2012/0319985 | A1* | 12/2012 | Moore et al. ........... 345/173 |
| 2013/0014041 | A1* | 1/2013 | Jaeger ................... 715/765 |
| 2013/0033448 | A1* | 2/2013 | Yano et al. ............ 345/173 |

OTHER PUBLICATIONS

Makeuseof, "5 Tricks to Optomize & Customize your iPhone's Text & Emails," retrieved from J:\1133-Google Inc\533US01-Finger Gestures\E-Filing Application and IDS\Art to upload\5 Tricks to Optimize & Customize Your iPhone's Text & Emails.mht, accessed on Jul. 27, 2012, 11 pp.

Myslewski, Apple wants to swipe your iPhone, The Register, Dec. 29, 2008, retrieved from http://www.theregister.co.uk/2008/12/29/swipe_patent/, 4 pp.

Codea, Lists—an experiment in "zero interface," Updated, retrieved from http://twolivesleft.com/Codea/Talk/discussion/610/lists-an-experiment-in-zero-interface-updated/p1, accessed on Aug. 28, 2012, 11 pp.

U.S. Appl. No. 60/430,338, by Daniel Suraqui, filed Nov. 29, 2002.

U.S. Appl. No. 60/505,724, by Daniel Suraqui, filed Sep. 22, 2003.

International Search Report and Written Opinion from International Application from International Application No. PCT/US2013/066611, dated May 6, 2014, 9 pp.

* cited by examiner

KEYBOARD GESTURES FOR CHARACTER STRING REPLACEMENT

This application claims the benefit of U.S. Provisional Application No. 61/721,672, filed Nov. 2, 2012, the entire content of which is hereby incorporated by reference.

BACKGROUND

Computing devices may provide users with the ability to interact with processes and data using a variety of input and output devices operatively coupled thereto and/or in communication therewith. For example, a computing device may include a presence-sensitive display that can detect the location of a touch or presence within a predetermined display area displayed at the presence-sensitive display. A user may thus provide input to the computing device by, for example, entering a touch, tap, or contact-less gesture at the presence-sensitive display. The computing device may further present a graphical (or "soft") keyboard on the presence-sensitive display that permits the user to enter data by selecting, via one or more gestures, one or more keys of the graphical keyboard. To delete one or more characters, the user may touch or tap a backspace key included in the graphical keyboard to indicate that one or more displayed letters should be deleted.

SUMMARY

In one example, the disclosure is directed to a method comprising receiving, by a computing device, an indication of a first user input detected at a presence-sensitive display operatively coupled to the computing device, outputting, by the computing device and for display at the presence-sensitive display, text based on the first user input detected at the presence-sensitive display, determining, by the computing device, a list of one or more suggested character strings based on the text, outputting, by the computing device and for display at the presence-sensitive display, the list of one or more suggested character strings, receiving, by the computing device, an indication of a second user input detected at the presence-sensitive display, determining whether the received gesture input includes a replacement gesture, wherein the replacement gesture includes a first gesture in a substantially leftward direction and a second gesture in a substantially rightward direction, and responsive to determining that the received gesture input includes the replacement gesture, outputting, by the computing device and for display at the presence-sensitive display in place of the displayed text, a character string chosen from the list of one or more suggested character strings.

In another example, the disclosure is directed to a device comprising at least one processor and at least one module operable by the at least one processor to receive, by a computing device, an indication of a first user input detected at a presence-sensitive display operatively coupled to the computing device, output, by the computing device and for display at the presence-sensitive display, text based on the first user input detected at the presence-sensitive display, determine, by the computing device, a list of one or more suggested character strings based on the text input, output, by the computing device and for display at the presence-sensitive display, the list of one or more suggested character strings, receive, by the computing device, an indication of a second user input detected at the presence-sensitive display, determine whether the received second user input includes a replacement gesture, wherein the replacement gesture includes a first gesture in a substantially leftward direction and a second gesture in a substantially rightward direction, and responsive to determining that the received gesture input includes the replacement gesture, output, by the computing device and for display at the presence-sensitive display in place of the displayed text, a character string chosen from the list of one or more suggested character strings.

In another example, the disclosure is directed to a computer-readable storage medium encoded with instructions that, when executed, cause at least one processor of a computing device to perform operations comprising receiving, by a computing device, an indication of a first user input detected at a presence-sensitive display operatively coupled to the computing device, outputting, by the computing device and for display at the presence-sensitive display, text based on the first input detected at the presence-sensitive display, determining, by the computing device, a list of one or more suggested character strings based on the text, outputting, by the computing device and for display at the presence-sensitive display, the list of one or more suggested character strings, receiving, by the computing device, an indication of a second user input detected at the presence-sensitive display, determining whether the received second user input includes a replacement gesture, wherein the replacement gesture includes a first gesture in a substantially leftward direction and a second gesture in a substantially rightward direction, and responsive to determining that the received gesture input includes the replacement gesture, outputting, by the computing device and for display at the presence-sensitive display in place of the displayed text, a character string chosen from the list of one or more suggested character strings.

The details of one or more examples are set forth in the accompanying drawings and the description below. Other features and advantages will be apparent from the description and drawings, and from the claims.

DETAILED DESCRIPTION

In general, the disclosure is directed to techniques for text replacement on a computing device such as a smartphone, tablet, personal digital assistant (PDA), personal computer, or other computing device. Many text entry applications include software to assist the user during text input by performing various tasks such as spell checking, word completion based on the first few letters of a word, and/or "predicting" a word or words the user intends to type. Such software may analyze the text input based on spelling, syntax, grammar, frequency, recentness of use, etc., and may present a list of words or suggested character strings based on the analysis.

The techniques of the disclosure may enable a user to replace text input using one or more gestures entered at a user interface device (such as a presence-sensitive display) operatively coupled to the computing device. The one or more gestures will be referred to herein as a "replacement gesture." Upon detection of a replacement gesture, the computing device may replace the text input with an alternative character string chosen from the list of suggested character strings. The replacement gesture techniques may help to improve text entry speed, efficiency, and/or accuracy.

The replacement gestures may include one or more sequential strokes, or sliding movements, across a user interface device such as a presence-sensitive display. For example, the replacement gesture may include a first swipe across the display in a substantially leftward direction, and a second swipe across the display in a substantially rightward direction.

In one example, the computing device may replace the text input with the first or highest ranked character string in the list of suggested character strings. The term "character string" as used herein may include, but is not limited to, one or more characters, a single word, multiple words, phrases, compound words (e.g., a lot), or any other combination of characters. A "character string" may further include alpha-numeric characters such as letters and numbers, punctuation marks, symbols, emoticons, or any combination thereof.

Figure 1:
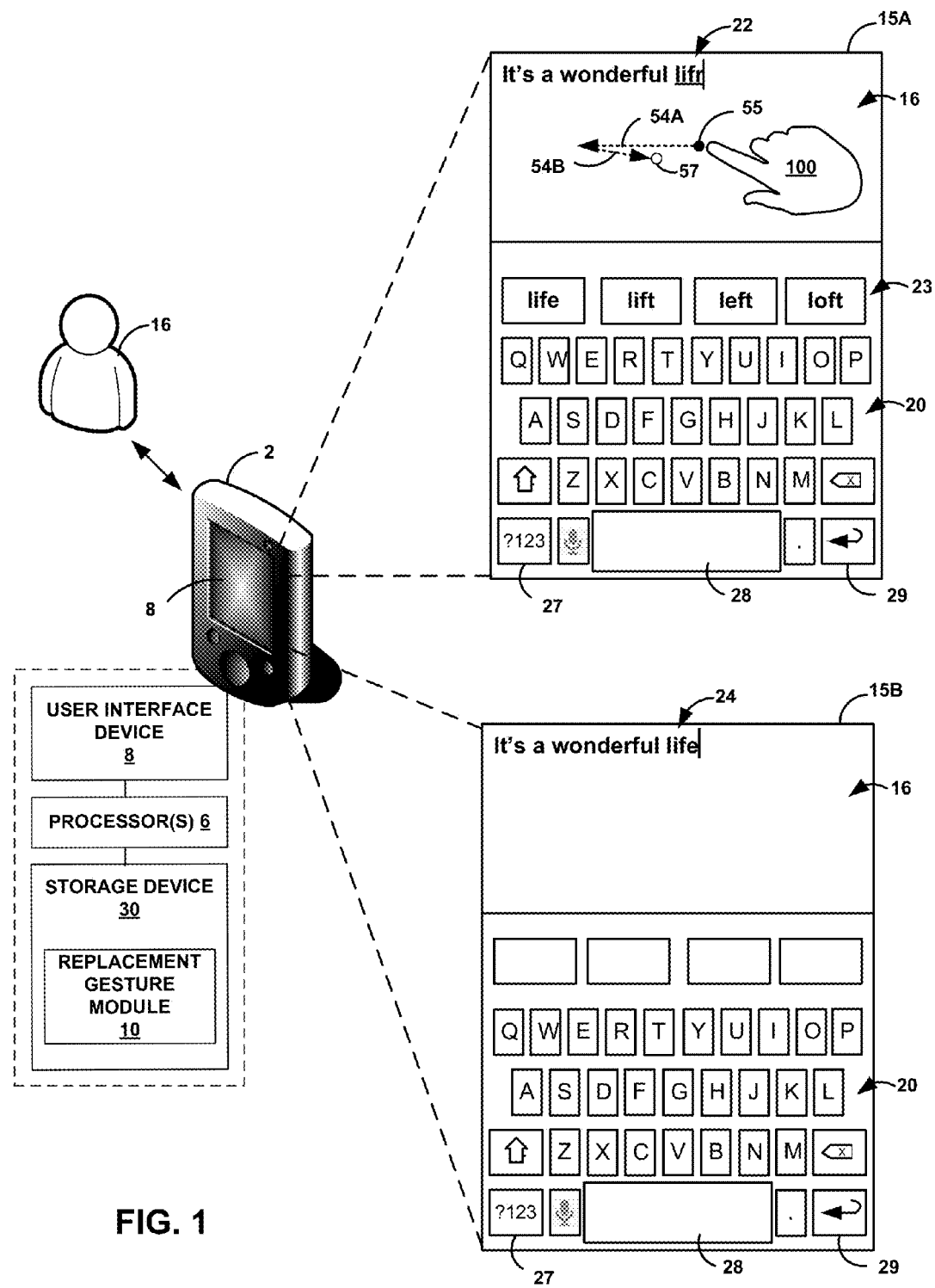
FIG. 1 is a conceptual diagram illustrating an example of a computing device for executing text replacement gestures, in accordance with one or more aspects of the present disclosure.

FIG. 1 is a conceptual diagram illustrating an example of a computing device 2 having text replacement gesture functionality. Computing device 2 may include one or more stand-alone devices or may be part of a larger system. In certain examples, computing device 2 may include a mobile device. For example, computing device 2 may include or be part of a wireless communication device (e.g., wireless mobile handset or device), a video telephone, smart phone, a digital multimedia player, a personal digital assistant (PDA), a video game console, tablet PC, a laptop computer, a personal computer, e-book reader, or other computing device. In some examples, computing device 2 may communicate with other devices via one or more networks (not shown), such as one or more wired or wireless networks, including the Internet, a cell phone network, etc.

Example computing device 2 may include one or more processor(s) 6, storage device(s) 30, and a user interface device 8. User interface device 8 may include a display that presents (outputs) information to a user 16, such as web page content, documents, text, video, application interfaces, or any other type of information that may be displayed. In one example, user interface device 8 may include a presence-sensitive display that, in addition to output (display) capabilities, is also configured to detect the location of a touch or presence within a predetermined display area displayed at the presence-sensitive display. User 16 may initiate functionality of the device and input content by interacting with the presence-sensitive display 8 or with various other user interface devices that may be provided by computing device 2.

In addition to display 8, computing device 2 may include other types of user interface devices that permit interaction between user 16 and computing device 2. For example, computing device 2 may also include one or more of a keyboard, a mouse, a button, a touchpad, a track pad, a touch screen, a microphone, a camera, a speaker, a sound card, a video graphics card, a light emitting diode (LED) or other visual indicator, etc.

Processor(s) 6 may include, for example, any one or more of a microprocessor, a controller, a digital signal processor (DSP), an application specific integrated circuit (ASIC), a field-programmable gate array (FPGA), or equivalent discrete or integrated logic circuitry. Processor(s) 6 may be configured to implement functionality and/or process instructions for execution within computing device 2.

Storage device 30 may be configured to store information within computing device 2. Storage device 30 may, for example, be described as a computer-readable storage medium. Storage device 30 may store instructions for execution by processor(s) 6. Storage device 30 may further store information or data used, received, or generated during operation of computing device 2.

Storage device 30 may store one or more computer-readable modules, such as a replacement gesture module 10. Replacement gesture module 10 includes instructions and data that, when executed by processor(s) 6, provides computing device 2 with text replacement gesture functionality. Further details concerning replacement gesture module 10 will be described below.

Storage device 30 may further include other computer-readable modules and applications that govern operation of computing device 2 (such as an operating system) or permit a user to perform various functions using computing device 2 (such as messaging applications, phone-based applications, games, music players, etc.). Storage device 20 may further store data that is used, received, or generated during operation of computing device 2.

During execution, one or more various modules or applications running on computing device 2 may implement, invoke, execute, or otherwise utilize replacement gesture module 10 as a mechanism to provide text replacement gesture functionality. In general, replacement gesture module 10 may be used during any operation on computing device 2 during which text or other character data may be entered by a user. For example, a user of a computing device may input text or characters to take notes, compose emails or text messages, input commands, make lists, compose documents, prepare programming language code, prepare web content, make posts to social networking services, and/or to perform other tasks involving entry of text or other character data.

In the example of FIG. 1, computing device 2 may present an image, such as example image 15A, on display 8. Image 15A may include, for example, a virtual (or "soft") keyboard 20 and a text display area 16. Image 15A may further include various other elements relevant to text entry.

In the example of FIG. 1, keyboard 20 is presented using a QWERTY keyboard layout. However, it shall be understood that other keyboard layouts and arrangements may also be used. For example, keyboard 20 may be presented using a split keyboard layout, in which the keyboard is split into two groups of virtual keys displayed at two different regions of display 8. In other examples, one or more of the keys in keyboard 20 or within image 15A may be moved, resized, or customized by the user. For example, computing device 2 may store different virtual key layouts, user preferences, and character choices that may be accessed for customizing the layout and/or the function of various keys on the keyboard 20, or various elements of image 15A. In general, the size, shape, and/or arrangement of the keyboard 20 and/or image 15A are for purposes of illustration only, and the disclosure is not limited in this respect.

Keyboard 20 may include virtual keys that represent letters of the alphabet, punctuation marks, a space bar 28, and/or other keys that may be helpful for entering text or other characters. Keyboard 20 may also include one or more other virtual keys, such as a switch layout to number and symbols key 27, an enter key 29, a backspace key, a shift key, a switch languages key, a microphone key, or any other key appropriate receiving user input on computing device 2.

Replacement gesture module 10 enables a user to replace text input (for example, words, numbers, symbols, or any combination thereof) using one or more replacement gestures entered at user interface device 8, such as a presence-sensitive display. In FIG. 1, for example, the user has attempted to enter the word "life" on virtual keyboard 20. However, the user has mistakenly entered the characters, "lifr." The text input "life", indicated by reference numeral 22, is displayed on computing device 2 in text display area 16 of image 15A.

In addition, computing device 2 may analyze the text input to generate and display a list of suggested character strings 23. This analysis of the text input may be performed using, for example, spell checking, auto-correct, word completion, word prediction, or other techniques known in the art. The list of suggested character strings 23 may include alternatives to the text input in an attempt to correct common spelling or typing errors, or may include a list of predictions based on entry of the first few letters of a word or words, for example. In some examples, the list of suggested character strings 23 may be presented in a ranked order from the most probable (highest ranked) match to the text input and then in descending order of relatively less probable (lower ranked) matches to the text input.

At some point during the text entry process, user 16 may decide to replace the most recent text input, in this case the word "lifr" 22, with a word from the list of suggested character strings 23. To that end, user 16 may execute a replacement gesture on presence-sensitive display 8. In response to detection of the replacement gesture, computing device 2 may replace the text input with a character string from the list of suggested character strings 23. The replacement gesture may include one or more movements across the presence-sensitive display that computing device 2 interprets as a command to perform the replacement function. For example, the user may execute a replacement gesture by sliding a finger or other input tool, such as a stylus, pen, brush, etc., across the presence-sensitive display in a predefined pattern. In FIG. 1, for example, the replacement gesture (referred to generally as replacement gesture 54) includes a first swipe 54A across display 8 in a first, substantially leftward, direction and a second, subsequent swipe 54B in a second, substantially rightward, direction. Replacement gesture 54 may further include a touch down 55 (e.g., an initial touch, tap, or other contact with a finger or other input tool on presence-sensitive display 8) and/or a touch up 57 (e.g., a release or lifting of the finger or other tool from the presence-sensitive display 8). Although a specific example replacement gesture 54 is shown in FIG. 1, it shall be understood that other replacement gestures may also be used, and that the disclosure is not limited in this respect.

Replacement gesture module 10 includes instructions that, when executed by processor(s) 6 of computing device 2, permit detection of any replacement gestures (such as example replacement gesture 54) received at presence-sensitive display 8. Replacement gesture module 10 further includes instructions that, when executed by processor(s) 6 of computing device 2, permit replacement of the text input with a character string from the list of suggested character strings 23. For example, the text input may be replaced with the first (highest ranked) character string in the list of suggested alternative character strings. In FIG. 1, for example, upon detection of example replacement gesture 54, computing device 2 may replace the text input, "lifr," with the first character string in list of suggested character strings 23, "life." Thus, after detection of example replacement gesture 54, display 8 may present an image such as example image 15B, in which the character string "lifr" has been replaced with the character string, "life."

Keyboard gestures for text replacement may improve typing speed with a useful way for the user to replace misspelled or mistyped words with alternative character strings from a list of suggested character strings. Using a replacement gesture to replace the character string may save the user time from having to delete characters or to retype the character string. Keyboard gestures for text replacement may therefore help to improve text input speed, accuracy, and/or efficiency.

Figure 2:
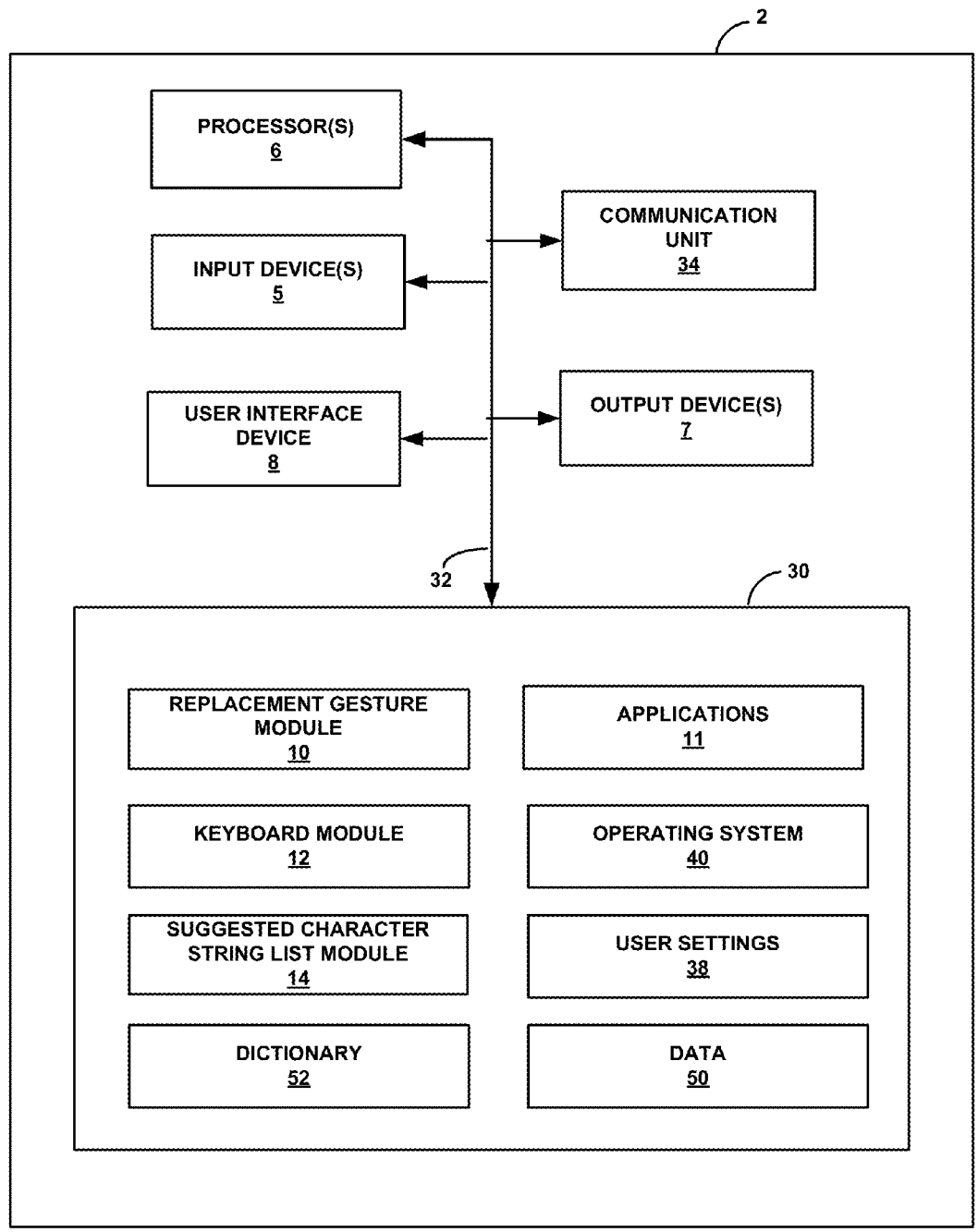
FIG. 2 is a block diagram illustrating an example computing device for executing text replacement gestures, in accordance with one or more aspects of the present disclosure.

FIG. 2 is a block diagram illustrating an example computing device 2 that includes text replacement gesture functionality. FIG. 2 illustrates one example of computing device 2, and many other examples of computing device 2 may be implemented. Example computing device 2 may include one or more processor(s) 6, a communication unit(s) 34, storage device 35, one or more input device(s) 5, and one or more output device(s) 7. The components of computing device 2 may be interconnected (physically, communicatively, and/or operatively) by communication channels 32 for inter-component communications. Communication channels 32 may include a system bus, network connection, interprocess communication data structure, or any other channel for communicating data. Applications 11 and operating system 40 may also communicate information with one another as well as with other components in computing device 2.

Computing device 2 may utilize communication unit 34 to communicate with external devices (not shown) via one or more networks, such as one or more wireless networks. The external devices may include, for example, server computers, mobile phones, networked computing devices, etc. Communication unit 34 may include one or more of a network interface card, such as an Ethernet card, an optical transceiver, a radio frequency (RF) transceiver, cellular network interface, or any other type of device that can send and receive information. Examples of wireless communication interfaces may include Bluetooth, RF, and Wi-Fi. Any applications implemented within or executed by computing device 2 (e.g., applications 11) may be implemented or contained within, operable by, executed by, and/or be operatively coupled to processor(s) 6, communication unit 34, and/or storage device 35.

Computing device 2 may also include one or more input devices 5. Input device 5, in some examples, is configured to receive input from a user through a graphical user interface using tactile, audio, or video feedback. Examples of input device 5 include a presence-sensitive display, touch screen, a mouse, a keyboard, a voice responsive system, video camera, microphone, or any other type of device for detecting or receiving user input.

Computing device 2 may also include one or more output devices 7. Output device 7 may be configured to provide output to a user at a graphical user interface (for example, user interface 4 in FIG. 1) using tactile, audio, or video stimuli. Output device 7 may include a presence-sensitive display, a sound card, a video graphics adapter card, or any other type of device for converting a signal into an appropriate form understandable to humans or machines. Additional examples of output device 7 may include a speaker, a cathode ray tube (CRT) monitor, a liquid crystal display (LCD), or any other type of device that can generate user output.

In some examples, certain types of user interface devices may function both as an input device 5 and an output device 7. For example, a presence-sensitive display, such as display 8 of FIGS. 1 and 2, may function both as an input device and an output device.

Computing device 2 may include additional components that, for clarity, are not shown in FIG. 2. For example, computing device 2 may include a battery to provide power to the components of computing device 2. Similarly, the components of computing device 2 shown in FIG. 2 may not be included in every example of computing device 2. For instance computing device 2 may not, in all examples, include communication unit 34.

Storage device 30 may include one or more devices used to store data or programs on a temporary or permanent basis. For example, storage device 30 may include a temporary memory, meaning that a primary purpose of at least part of memory 30 is not long-term storage. Storage device 30 may also include volatile memory, meaning that at least part of storage 30 does not maintain stored contents when the computing device is turned off. Examples of volatile memories include random access memories (RAM), dynamic random access memories (DRAM), static random access memories (SRAM), and other forms of volatile memories known in the art. Storage device 30 may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Storage device 30 may store applications 11, an operating system 40, user settings 38, and data storage 50. Operating system 40, for example, manages the overall operation of computing device 2, facilitates interaction between the various hardware components, and manages execution of software/firmware applications. Data storage 50 may include any data used, received, or generated by computing device 2. User settings 38 may include one or more settings that permit a user to customize computing device 2 as desired. User settings 38 may be configured as a database, flat file, table, tree, or other data structure stored within storage device 30 of computing device 2. In some examples, user settings 38 may be configured as separate data repositories while, in other examples, they may be a part of a single data repository.

Applications 11 may include one or more built-in applications that are loaded onto computing device 2 at the time of manufacture, and/or one or more applications that are downloaded or programmed into computing device 2 at a later time. Applications 11 may include, for example, one or more of web browsers, enterprise software, accounting software, office suites, graphics software, media players, word processing applications, video games, music or video players, video or sound recorders, camera applications, screen savers, social networking applications, messaging applications, photo management applications, navigation and/or mapping applications, calendar applications, telephone applications, banking applications, etc.

As shown in FIG. 2, storage device 30 further includes replacement gesture module 10, a keyboard module 12, a suggested character string module 14, and a dictionary 52. As discussed above, replacement gesture module 10 includes instructions and data that, when executed by processor(s) 6, provides computing device 2 with text replacement gesture functionality. Keyboard module 12 includes instructions and data that, when executed by processor(s) 6, permits computing device 2 to present a virtual keyboard, such as keyboard 20 on a presence-sensitive display 8 as shown in FIG. 1. Suggested character string list module 14, when executed by processor(s) 6, provides computing device 2 with functionality to generate and output for display a list of one or more suggested character strings. Dictionary 52 may include, for example, a known list of correctly spelled words. Suggested character string module 14 may compare the text input against one or more of the words in dictionary 52 to generate the list of suggested character strings. In some examples, dictionary 52 may also include a list of user-customized character strings. Dictionary 52 may also include a list of commonly encountered typos and/or commonly misspelled words and an associated correct spelling of the word. Dictionary 52 may also include common phrases or other word combinations. Dictionary 52 may also include grammar, syntax, and/or word prediction data, or any other data used for analyzing the text input and/or generating a list of suggested character strings.

To provide replacement gesture functionality, replacement gesture module 10 includes instructions that when executed by processor(s) 6 of computing device 2, permit computing device 2 to detect any replacement gestures (such as example replacement gesture 54) received by, for example, user interface device 8. The replacement gesture may include one or more movements detected by user interface device 8 that computing device 2 interprets as a command to perform the replacement function. For example, a user may enter a replacement gesture by sliding a finger or other input device, such as a stylus, pen, brush, etc., across the presence-sensitive display in a predefined pattern.

Replacement gesture module 10 includes replacement gesture data corresponding to one or more predetermined replacement gestures. For example, a replacement gesture may include a plurality of points of contact entered in a predetermined pattern within a display area of user interface device 8. To that end, the replacement gesture data may include a set of ordered coordinates corresponding to the relative order and position for each point of contact that makes up the replacement gesture. The replacement gesture data may further include relative time information corresponding to each point of contact in the replacement gesture. The relative time information may be indicative of the relative time at which the ordered points of contact should occur to be considered as part of a replacement gesture.

Touch input received by computing device 2 is analyzed by processor(s) 6 under control of replacement gesture module 10 to identify whether any of the touch input corresponds with a predetermined replacement gesture. For example, processor(s) 6 may compare the touch input with the replacement gesture data to detect whether the touch input includes a predetermined replacement gesture.

Upon detection of a replacement gesture, processor(s) 6, under control of replacement gesture module 10, may replace the displayed text input with a character string from the list of suggested character strings. For example, the text input displayed on user interface device 8 may be replaced with the first (highest ranked) character string in the list of suggested character strings. In the example of FIG. 1, for example, in response to detection of replacement gesture 54, computing device 2 has replaced the text input "lifr" with the first character string in list of suggested character strings 23, "life," as shown in image 15B.

In some examples, the position of the replacement gesture must be detected within the text display area of the user interface device (e.g., within text display area 16 of FIG. 1). This may help to distinguish a replacement gesture from contact intended by the user to enter characters using the virtual keys of keyboard 20. In other examples, the position of the replacement gesture may be detected anywhere within display area of user interface device 8. In those examples, replacement gesture module 10 is able to distinguish between contact intended as a replacement gesture and contact intended for other purposes.

Figure 3:
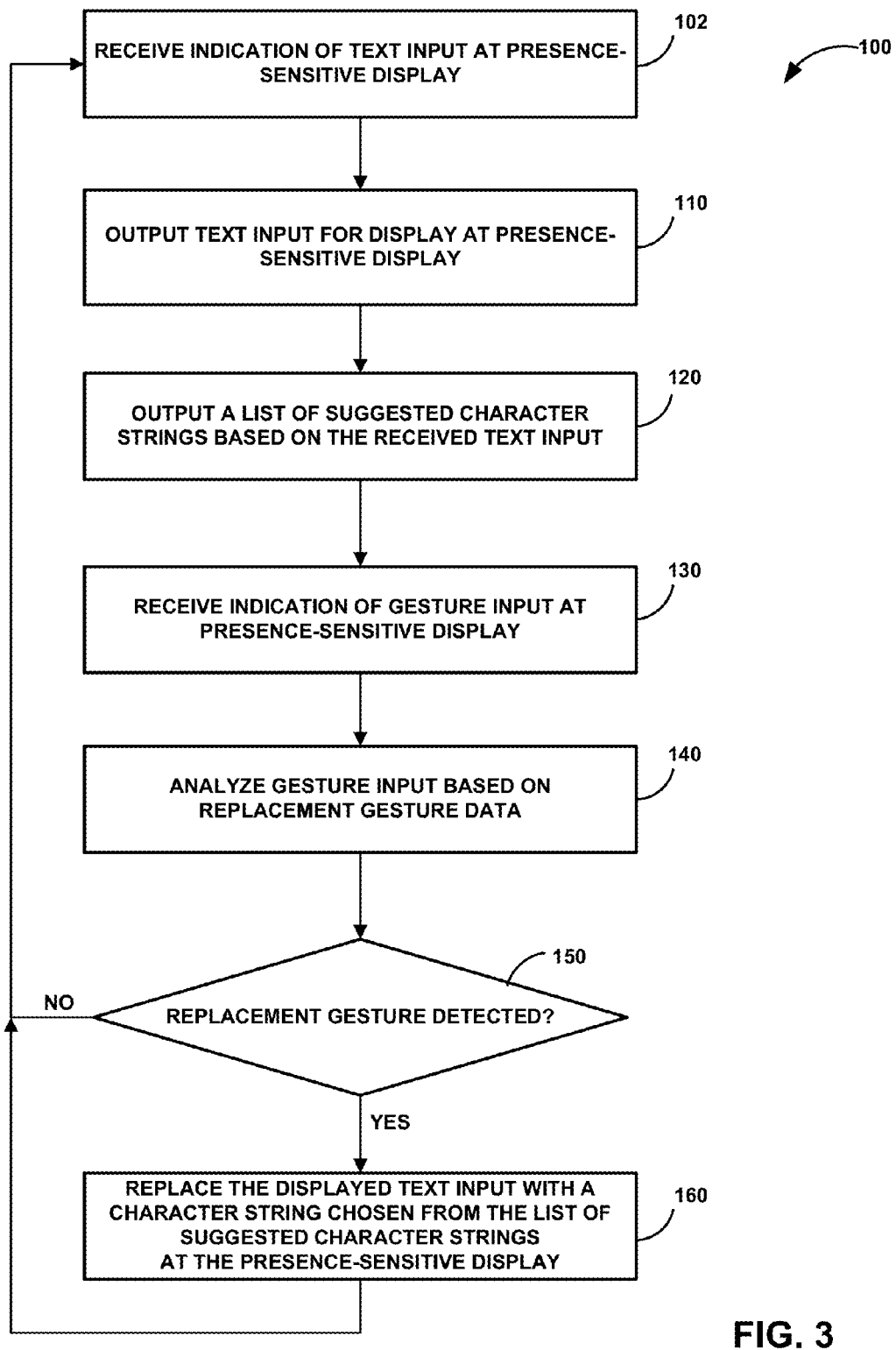
FIG. 3 is a flowchart illustrating an example process for executing text replacement gestures, in accordance with one or more aspects of the present disclosure.

FIG. 3 is a flowchart illustrating an example process (100) or method that may be performed by or embodied in a computing device, such as computing device 2 of FIGS. 1 and/or 2, to implement text replacement gesture functionality. Process (100) is one example, and other implementations may include more or fewer aspects than those depicted in FIG. 3.

Computing device 2 may receive an indication of text input detected at an input device, such as a presence-sensitive display (102). Computing device 2 may output the text input for display at the presence-sensitive display (110). For example, computing device 2 may output text input, such as text input 22 "lifr" at text display area 16 of image 15A as shown in FIG. 1.

Computing device 2 may output a list of one or more suggested character strings for display based on the text input (120). For example, the computing device may analyze the text input and generate a list of one or more suggested character strings based on the analysis. Computing device may further output the list of suggested character strings, such as the list of character strings 23, for display within image 15A as shown in FIG. 1.

Computing device 2 may receive an indication of gesture input at the presence-sensitive display (130). Computing device 2 may analyze the received gesture input to identify whether any of the gesture input corresponds with one or more predetermined replacement gestures (140). For example, computing device 2 may compare the indication of the gesture input with replacement gesture data corresponding to one or more predetermined replacement gestures. In one example, the replacement gesture data may define a replacement gesture that includes a first swipe in a generally leftward direction and a second swipe in a generally rightward direction, such as replacement gesture 54 shown in FIG. 1.

In some examples, in order for computing device to interpret detected first and second swipes as a replacement gesture, the first swipe and the second swipe must be detected within a predetermined period of time. The predetermined period of time may be, for example, in the range of 0 to 1 second. In another example, in order for the computing device to interpret the first and second swipes as a replacement gesture, computing device must not detect meaningful gesture movement for a predetermined period of time after the second swipe. In other examples, one or more alternative replacement gesture(s) may be detected in addition to or alternatively to the specific replacement gesture shown in FIG. 1.

In response to detection of the replacement gesture (150), the computing device may replace the displayed text input with a replacement character string chosen from the list of suggested character strings (140). For example, responsive to receiving the indication of the replacement gesture, the computing device may replace the displayed text input with one of the character strings from the list of suggested character strings. In one example, the replacement character string may include a first or highest ranked character string in the list of suggested character strings. The first or highest ranked character string may be the character string having the highest probability of matching the text input as determined by character string identification techniques known in the art such as those used in spell checking, auto-correct, word completion or word prediction applications. In some examples, list of suggested character strings may be presented in a ranked order of probability from the most likely (highest ranked) match to the text input and descending to the least likely (lowest ranked) match to the text input.

To replace the text input (160), the computing device may delete the displayed text input (e.g., text input "lifr" 22 as shown in FIG. 1) and output for display the replacement character string chosen from the list of suggested character strings (e.g., replacement character string "life" 24 as shown in FIG. 1).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic, or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A method comprising:
   receiving, by a computing device, an indication of a first user input detected at a presence-sensitive display;
   outputting, by the computing device and for display in a text display area at the presence-sensitive display, text based on the first user input detected at the presence-sensitive display;
   determining, by the computing device, a list of one or more suggested character strings based on the text;
   outputting, by the computing device and for display at the presence-sensitive display, the list of one or more suggested character strings;
   receiving, by the computing device, an indication of a second user input detected at the presence-sensitive display;
   determining whether the received second user input includes a replacement gesture, wherein the replacement gesture includes a first gesture in a substantially leftward direction and a second gesture in a substantially rightward direction; and responsive to determining that the received gesture input includes the replacement gesture, outputting, by the computing device and for display at the presence-sensitive display in place of the text in the text display area, a character string from the list of one or more suggested character strings, wherein the character string is ranked higher than at least one other character string from the list of one or more suggested character strings that are ranked in a ranked order.

2. The method of claim 1, wherein the chosen character string is a first character string in the list of suggested character strings.

3. The method of claim 1, wherein the first input indicates a plurality of characters entered by a user at the presence-sensitive display.

4. The method of claim 1, wherein the second gesture in the substantially rightward direction is received subsequent to the first gesture in the substantially leftward direction.

5. The method of claim 1, further comprising comparing the received second input with replacement gesture data to identify whether the received second input includes the replacement gesture.

6. The method of claim 5, further comprising ranking, by the computing device, the list of one or more suggested character strings such that a highest ranked character string in the list of one or more suggested character strings is a most probable match to the plurality of characters entered at the presence-sensitive display.

7. The method of claim 1, wherein the list of one or more suggested character strings are displayed in a ranked order.

8. The method of claim 1, wherein the character string is a highest ranked character string from the list of one or more suggested character strings that are ranked in the ranked order.

9. The method of claim 1, wherein the replacement gesture is entered by a user at the presence-sensitive display.

10. The method of claim 1, wherein the list of one or more suggested character strings are displayed in a ranked order.

11. A device comprising:
 at least one processor; and
 at least one module operable by the at least one processor to:
  receive an indication of a first user input detected at a presence-sensitive display;
  output, for display in a text display area at the presence-sensitive display, text based on the first user input detected at the presence-sensitive display;
  determine a list of one or more suggested character strings based on the text;
  output, for display at the presence-sensitive display, the list of one or more suggested character strings;
  receive an indication of a second user input detected at the presence-sensitive display;
  determine whether the received second user input includes a replacement gesture, wherein the replacement gesture includes a first gesture in a substantially leftward direction and a second gesture in a substantially rightward direction; and
  responsive to determining that the received gesture input includes the replacement gesture, output, for display at the presence-sensitive display in place of the text in the text display area, a character string from the list of one or more suggested character strings, wherein the character string is ranked higher than at least one other character string from the list of one or more suggested character strings that are ranked in a ranked order.

12. The device of claim 11, wherein the plurality of characters includes text entered by a user at the presence-sensitive display.

13. The device of claim 11, wherein the replacement gesture is entered by a user at the presence-sensitive display.

14. The device of claim 11, wherein the gesture in the substantially rightward direction is received subsequent to the gesture in the substantially leftward direction.

15. The device of claim 11, wherein the character string is a highest ranked character string from the list of one or more suggested character strings that are ranked in the ranked order.

16. A computer-readable storage medium encoded with instructions that, when executed, cause at least one processor of a computing device to perform operations comprising:
 receiving, by a computing device, an indication of a first user input detected at a presence-sensitive display;
 outputting, by the computing device and for display in a text display area at the presence-sensitive display, text based on the first user input detected at the presence-sensitive display;
 determining, by the computing device, a list of one or more suggested character strings based on the text;
 outputting, by the computing device and for display at the presence-sensitive display, the list of one or more suggested character strings;
 receiving, by the computing device, an indication of a second user input detected at the presence-sensitive display;
 determining whether the received second user input includes a replacement gesture, wherein the replacement gesture includes a first gesture in a substantially leftward direction and a second gesture in a substantially rightward direction; and
 responsive to determining that the received gesture input includes the replacement gesture, outputting, by the computing device and for display at the presence-sensitive display in place of the text in the text display area, a character string from the list of one or more suggested character strings, wherein the character string is ranked higher than at least one other character string from the list of one or more suggested character strings that are ranked in a ranked order.

17. The computer-readable storage medium of claim 16, wherein the text input includes text entered by a user at the presence-sensitive display.

18. The computer-readable storage medium of claim 16, wherein the replacement gesture is executed by a user at the presence-sensitive display.

19. The computer-readable storage medium of claim 16, wherein the second gesture in the substantially rightward direction is received within a predetermined period of time from receipt of the first gesture in the substantially leftward direction.

20. The computer-readable storage medium of claim 16, wherein the character string is a highest ranked character string from the list of one or more suggested character strings that are ranked in the ranked order.

* * * * *